(12) United States Patent
Holda et al.

(10) Patent No.: US 12,570,383 B1
(45) Date of Patent: Mar. 10, 2026

(54) SYSTEMS AND METHODS FOR OPTIMIZING DRIVESHAFT COUPLING OF MARINE PROPULSION DEVICE

(71) Applicant: Brunswick Corporation, Mettawa, IL (US)

(72) Inventors: Joseph Holda, West Bend, WI (US); Brett Bielefeld, Oshkosh, WI (US)

(73) Assignee: Brunswick Corporation, Mettawa, IL (US)

( * ) Notice: Subject to any disclaimer, the term of this patent is extended or adjusted under 35 U.S.C. 154(b) by 498 days.

(21) Appl. No.: 17/579,005

(22) Filed: Jan. 19, 2022

(51) Int. Cl.
| | |
|---|---|
| *B63H 20/14* | (2006.01) |
| *F02B 61/04* | (2006.01) |
| *F16D 1/112* | (2006.01) |
| *F16D 1/10* | (2006.01) |

(52) U.S. Cl.
CPC ........... *B63H 20/14* (2013.01); *F02B 61/045* (2013.01); *F16D 1/112* (2013.01); *F16D 2001/103* (2013.01)

(58) Field of Classification Search
CPC ............. B63H 21/305; F16D 2001/103; F02B 61/045; Y10T 403/559
See application file for complete search history.

(56) References Cited

U.S. PATENT DOCUMENTS

| | | | | |
|---|---|---|---|---|
| 4,293,304 | A | * | 10/1981 | Sandstrom ........... B63H 21/305 |
| | | | | 440/83 |
| 4,747,796 | A | * | 5/1988 | Iwai ....................... B63H 20/32 |
| | | | | 464/83 |
| 4,832,637 | A | | 5/1989 | Goluba |
| 4,925,409 | A | | 5/1990 | Johnson |
| 5,720,638 | A | | 2/1998 | Hale |
| 5,863,253 | A | | 1/1999 | Rohs et al. |
| 6,123,620 | A | | 9/2000 | Polakowski |
| 6,322,407 | B1 | * | 11/2001 | Onoue ...................... F16D 3/76 |
| | | | | 440/83 |
| 6,488,553 | B2 | * | 12/2002 | Bourret ................ B63H 21/305 |
| | | | | 440/38 |

(Continued)

FOREIGN PATENT DOCUMENTS

| | | | | |
|---|---|---|---|---|
| GB | 2008518 A | * | 6/1979 | ............. B63H 23/04 |
| JP | 8-93500 | * | 9/1996 | ............... F16D 1/06 |
| JP | 11336523 A | * | 12/1999 | ............... F01M 1/02 |

*Primary Examiner* — Michael P Ferguson
(74) *Attorney, Agent, or Firm* — Andrus Intellectual Property Law, LLP

(57) ABSTRACT

A coupling assembly for a marine propulsion device of a marine vessel is provided. The coupling assembly includes a crankshaft operably coupled to an engine and a transmission shaft operably coupled to one or more propellors. The crankshaft has a first plurality of internal splines, and the transmission shaft has a second plurality of internal splines. The coupling assembly further includes a coupler having a cylindrical shaft that extends from a first end to a second end. The first end has a first plurality of external splines and the second end has a second plurality of external splines. The first plurality of internal splines are interdigitated with the first plurality of external splines, and the second plurality of internal splines are interdigitated with the second plurality of external splines such that torque is transmitted from the engine to the one or more propellors to propel the marine vessel.

10 Claims, 6 Drawing Sheets

(56) References Cited

U.S. PATENT DOCUMENTS

| 7,156,628 | B2 * | 1/2007 | White | F16D 3/185 |
| | | | | 418/61.3 |
| 7,238,070 | B2 | 7/2007 | Asakaze | |
| 9,476,459 | B2 * | 10/2016 | Lemmers, Jr. | F16D 1/116 |
| 9,518,627 | B2 * | 12/2016 | Pattok | F16D 1/10 |

* cited by examiner

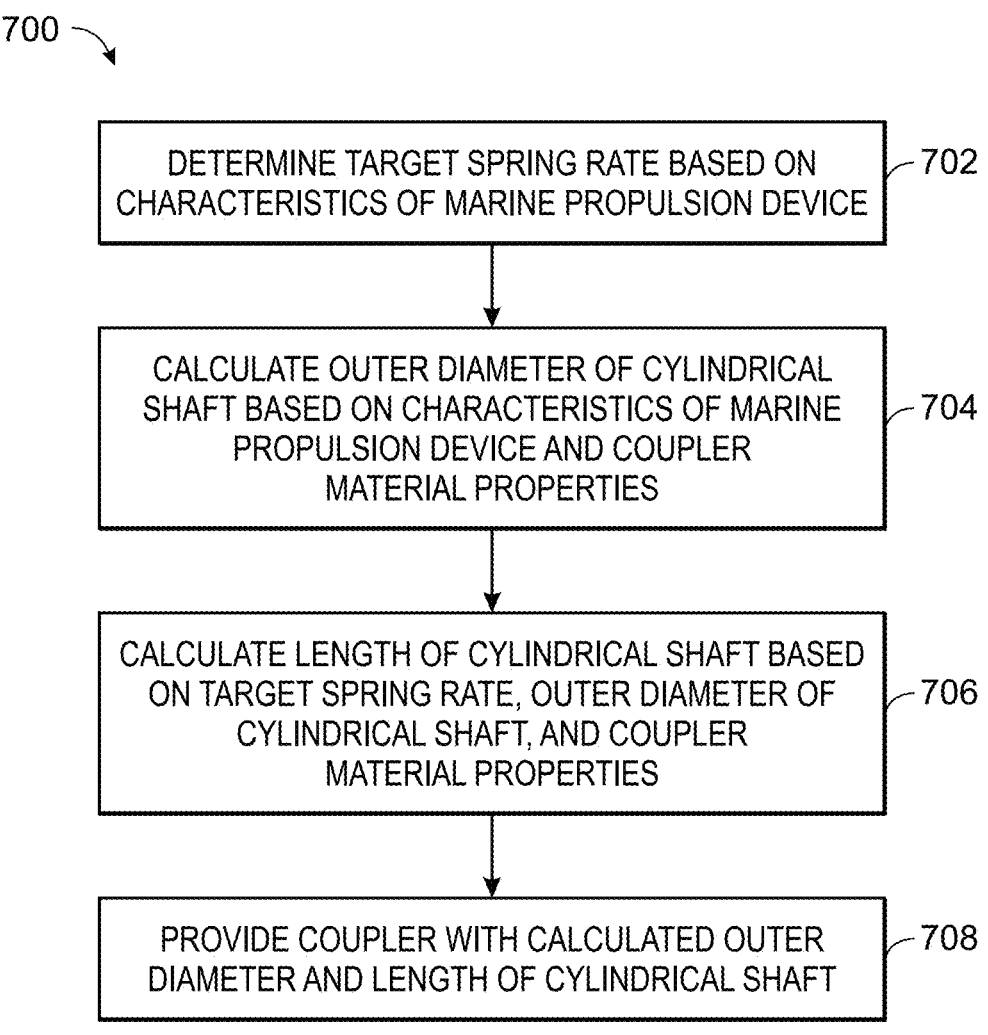

700

DETERMINE TARGET SPRING RATE BASED ON CHARACTERISTICS OF MARINE PROPULSION DEVICE ⟋702

CALCULATE OUTER DIAMETER OF CYLINDRICAL SHAFT BASED ON CHARACTERISTICS OF MARINE PROPULSION DEVICE AND COUPLER MATERIAL PROPERTIES ⟋704

CALCULATE LENGTH OF CYLINDRICAL SHAFT BASED ON TARGET SPRING RATE, OUTER DIAMETER OF CYLINDRICAL SHAFT, AND COUPLER MATERIAL PROPERTIES ⟋706

PROVIDE COUPLER WITH CALCULATED OUTER DIAMETER AND LENGTH OF CYLINDRICAL SHAFT ⟋708

FIG. 7

SYSTEMS AND METHODS FOR OPTIMIZING DRIVESHAFT COUPLING OF MARINE PROPULSION DEVICE

FIELD

The present disclosure relates to marine propulsion devices, and more particularly, pertains to an optimized shaft coupling for the driveshaft and transmission in a marine propulsion device.

BACKGROUND

U.S. Pat. No. 4,832,637 discloses a marine engine crankshaft that is coupled to a driveshaft for driving a propeller. The splined portion of the upper end of the driveshaft is provided with means to reduce the driveshaft rigidity by providing an intermediately positioned groove or undercut therein. The depth of the undercut is contemplated as being approximately the same as the channels between the splines, and the axial extent or length of the undercut is contemplated as being approximately equal to or greater than the undercut depth. In the assembled unit, the undercut is positioned at the outer terminus of the crankshaft. The result is a coupling wherein the rigidity of the driveshaft is reduced and it is free to flex more easily at the intersection of the members so that fatigue failure is substantially reduced.

U.S. Pat. No. 4,925,409 discloses a torsional damper for interconnecting the engine crankshaft and the driveshaft in a marine drive unit that utilizes a high viscosity fluid as the fluid drive medium and also to cushion the transmission from the crankshaft to the driveshaft of torsional vibrations created by peak engine firing impulses. The damper includes two sets of interleaved and overlapping damper plates disposed within a housing. One set of plates is attached to the crankshaft input for relative rotation therewith and the other set is attached to the driveshaft and driven by the high shear resistance of the transmission fluid. The extremely high viscosity fluid reduces slip between the plate sets and thus between the crankshaft and driveshaft to a minimum, yet effectively precludes the transmission of torsional vibrations which significantly reduce drive train life. The damper construction of the present invention may be adapted for use in both outboard motors and stern drives.

U.S. Pat. No. 5,720,638 discloses a jet propelled watercraft that has a coupling assembly to couple an engine crankshaft to a jet pump impeller shaft. The coupling assembly can accommodate substantial engine crankshaft vibrations, yet effectively isolates the jet pump impeller shaft from transverse movement. The coupling assembly includes an engine crankshaft coupling head, an intermediate coupler, an impeller shaft coupling head, and two elastomeric isolators positioned between each of the coupling heads and the intermediate coupler. The intermediate coupler is supported exclusively by the elastomeric isolators, and is allowed to tilt transverse to the rotational axis of the intermediate coupler to accommodate engine crankshaft displacement. The coupling assembly is practical for personal watercraft because, although elastomeric isolators wear or shred quickly in the presence of transverse misalignment, elastomeric isolators provide significant durability in the presence of a reasonable amount of angular displacement. The coupling assembly allows the engine to be soft mounted to the hull of the watercraft, and therefore significantly reduces engine noises resonating from the watercraft hull.

U.S. Pat. No. 5,863,253 discloses a torsional vibration damping assembly, comprising a rotating driving disk and a driven disk having a jacket surface with a polygonal cross-section. The driven disk is arranged coaxially with the driving disk and rotates in the same direction as the driving disk. The driving disk has an overlapping ring-shaped portion that partly grips over the driven disk. A plurality of radial pockets having wedge-shaped ends are disposed around the circumference of the inside face of the ring-shaped portion of the rotating driving disk. A pair of wedge-shaped thrust pistons are arranged in each of the radial pockets. The pistons are slightly curved or planar on their sides facing the jacket surface of the driven disk. There is at least one pressure spring arranged in each pocket that keeps the pistons apart from one another. There is also a plurality of devices such as pressure springs for effecting a reset moment from the driving disk to the driven disk during idle run, that exerts almost no frictional force.

U.S. Pat. No. 6,123,620 discloses a coupler which responds to relative rotation of a driving and a driven shaft with variable rates of stiffness. As the two shafts experience slight degrees of relative rotation, such as at idle speed, the elastically deformable member of the coupler responds in a relatively soft manner with a slight degree of stiffness. As relative rotation increases because of the transmission of higher torque between the driving and driven shafts, the elastically deformable member responds with a stiffer reaction. The elastically deformable member also reacts in a similar manner with differing rates of stiffness to misalignment of the driving and driven shafts.

U.S. Pat. No. 7,238,070 discloses a outboard motor cam that has a power transmission mechanism for transmitting rotational power of a crankshaft of an engine to a propeller through a drive shaft, an advancing/reversing-switching mechanism and a propeller shaft, and adapted to be propelled by the propeller being driven for rotation. A torque variation-absorbing device can be disposed in a coupling section between the crankshaft and the drive shaft, and supported through bearings.

Each of the above patents is hereby incorporated herein by reference in its entirety.

SUMMARY

This Summary is provided to introduce a selection of concepts that are further described herein below in the Detailed Description. This Summary is not intended to identify key or essential features of the claimed subject matter, nor is it intended to be used as an aid in limiting the scope of the claimed subject matter.

According to one example of the present disclosure, a coupling assembly for a marine propulsion device of a marine vessel is provided. The coupling assembly includes a crankshaft operably coupled to an engine and a transmission shaft operably coupled to one or more propellors. The crankshaft has a first plurality of internal splines, and the transmission shaft has a second plurality of internal splines. The coupling assembly further includes a coupler having a cylindrical shaft that extends from a first end to a second end. The first end has a first plurality of external splines and the second end has a second plurality of external splines. The first plurality of internal splines are interdigitated with the first plurality of external splines, and the second plurality of internal splines are interdigitated with the second plurality of external splines such that torque is transmitted from the engine to the one or more propellors to propel the marine vessel.

According to another example of the present disclosure, a coupling assembly for a marine propulsion device of a marine vessel is provided. The coupling assembly includes a first shaft having a first plurality of internal splines, a second shaft having a second plurality of internal splines, and a coupler having a cylindrical shaft that extends from a first end to a second end. The first end has a first plurality of external splines and the second end has a second plurality of external spline. The first plurality of internal splines are interdigitated with the first plurality of external splines, and the second plurality of internal splines are interdigitated with the second plurality of external splines such that torque is transmitted from the first shaft to the second shaft to propel the marine vessel. An outer diameter of the cylindrical shaft is less than a maximum diameter of the first plurality of internal splines and a maximum diameter of the second plurality of internal splines.

According to yet another example of the present disclosure, a method for optimizing a coupling assembly for a marine propulsion device of a marine vessel is provided. The method includes determining a target spring rate of a coupler utilized in the coupling assembly to transfer torque from a first shaft to a second shaft, calculating an outer diameter of a cylindrical shaft of the coupler based at least in part on characteristics of the marine propulsion device and material properties of the coupler, and calculating a length of the cylindrical shaft of the coupler based at least in part on the target spring rate, the calculated outer diameter of the cylindrical shaft, and the material properties of the coupler. The method further includes providing the coupler with the calculated outer diameter and the calculated length of the cylindrical shaft.

BRIEF DESCRIPTION OF THE DRAWINGS

The present disclosure is described with reference to the following Figures. The same numbers are used throughout the Figures to reference like features and like components.

FIG. 7 is a flow chart depicting a method for optimizing the characteristics of the spring coupler depicted in FIG. 4.

DETAILED DESCRIPTION

In the present description, certain terms have been used for brevity, clarity, and understanding. No unnecessary limitations are to be inferred therefrom beyond the requirement of the prior art because such terms are used for descriptive purposes only and are intended to be broadly construed.

Figure 1:
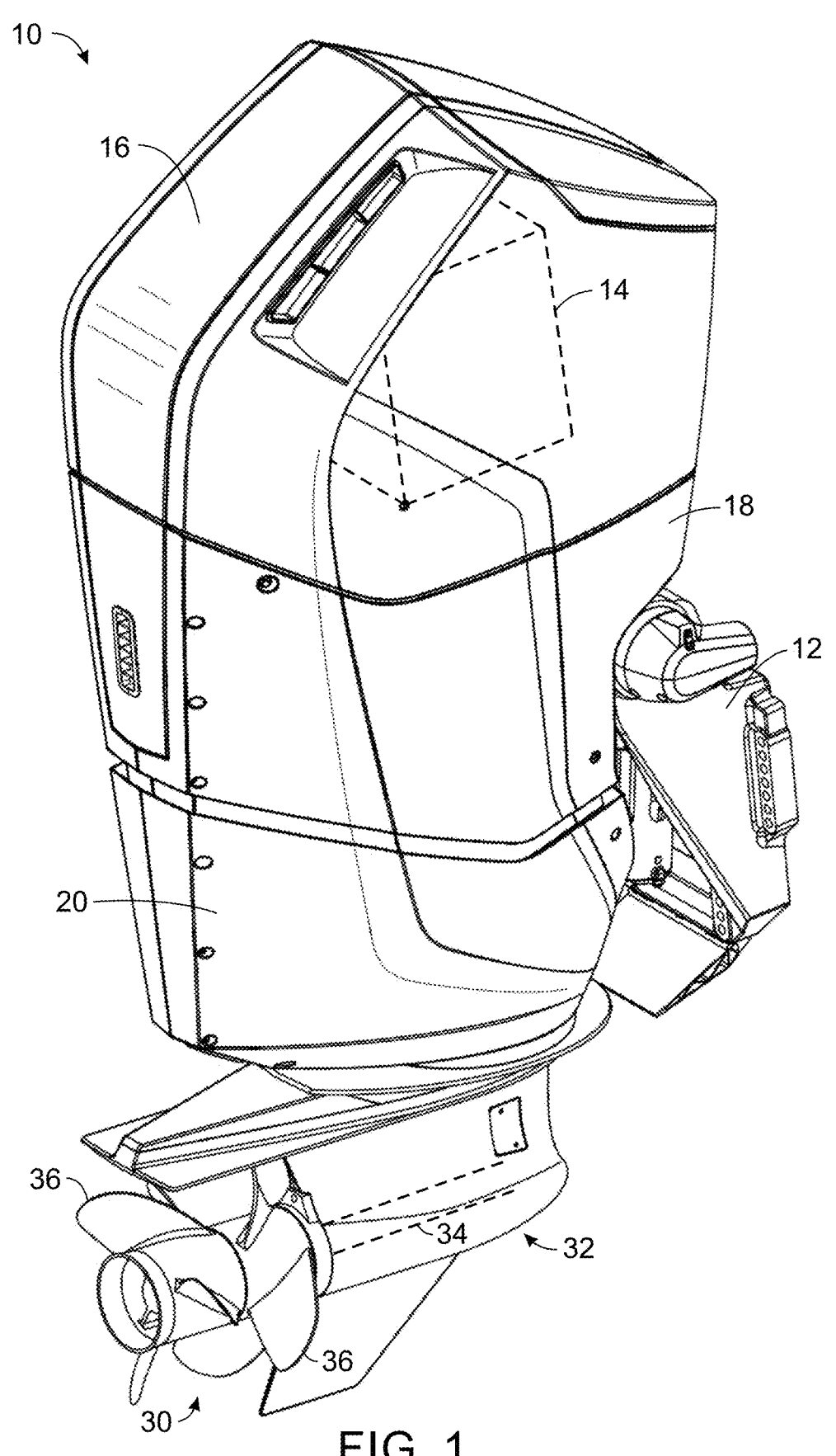
FIG. 1 is a perspective view of a starboard side of an outboard motor for propelling a marine vessel.
Figure 2:
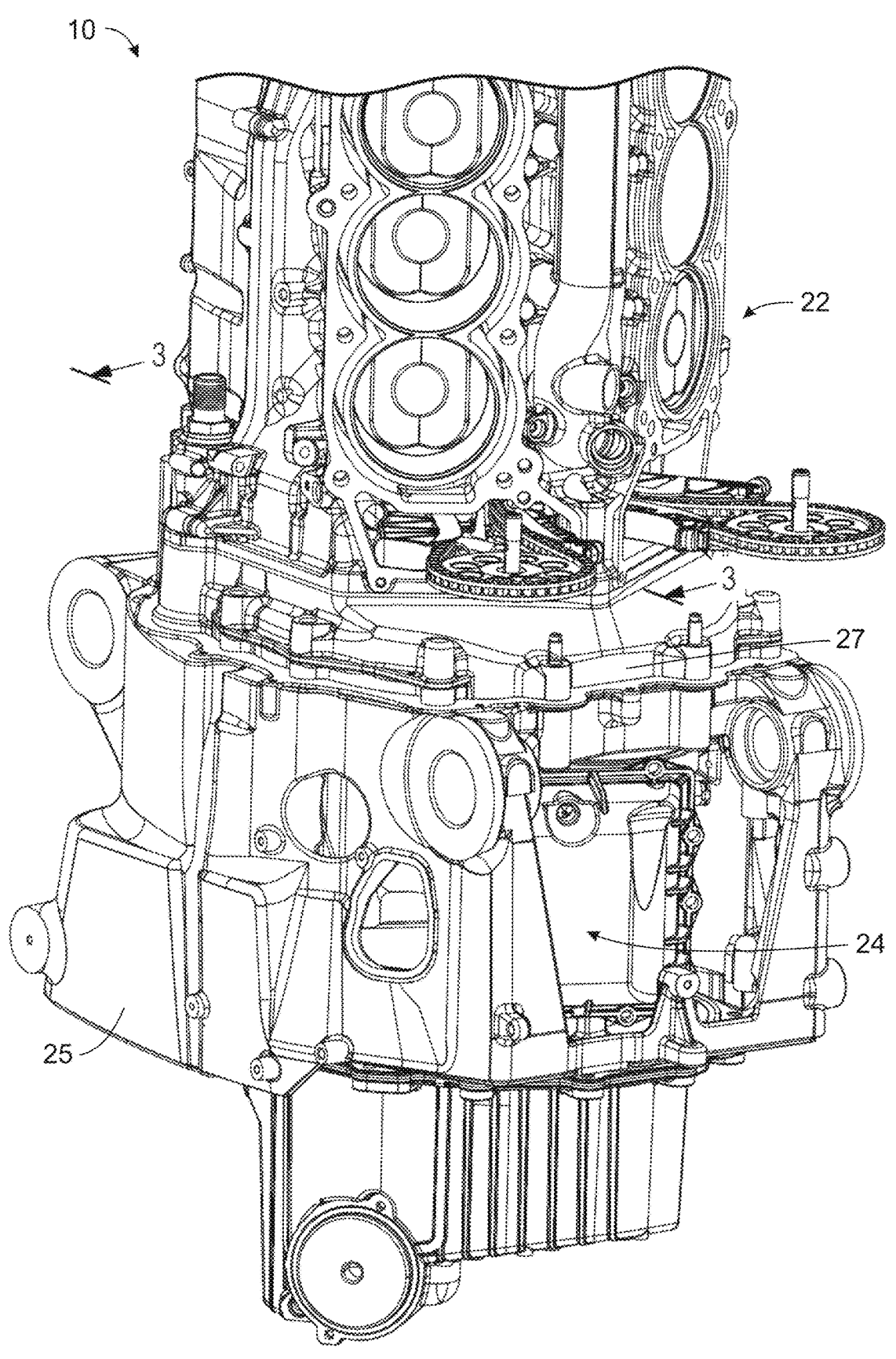
FIG. 2 is a perspective view of the outboard motor of FIG. 1 with the cowl components removed.

FIGS. 1 and 2 depict an outboard marine propulsion device 10 for propelling a marine vessel (not shown) in water. The outboard marine propulsion device 10 is connected to the transom of the marine vessel by a transom bracket 12. As is conventional, the outboard marine propulsion device 10 includes an internal combustion engine 14 located within an upper cowling structure 16. Other components of the cowling system include mid cowling structure 18 and lower cowling structure 20.

The engine 14 includes an engine cylinder block 22 (see FIG. 2) having vertically-aligned banks of piston-cylinders that at extend at an angle with respect to each other so as to form a V-shape. The number of piston-cylinders can vary, and together can form a conventional configuration (e.g., V-6, V-8, V-10, V-12). A transmission 24 is attached to the engine oil sump 25, which is attached to the cylinder block 22 via an adapter plate 27. Operation of the engine 14 causes rotation of a crankshaft 26. The crankshaft 26 is operably connected via a transmission shaft 28 to a propulsor 30 in a gearcase 32, such that rotation of the crankshaft 26 causes rotation of the propulsor 30 to thereby create a thrust force in the body of water that propels the outboard device 10 and the marine vessel. The crankshaft 26 normally rotates forwardly and the transmission shaft 28 operatively engages the crankshaft 26 with the propulsor 30 in forward and reverse gears, and operatively disengages the components in neutral, as is conventional. The type and configuration of the propulsor 30 can vary from what is shown and described. In the illustrated example, the propulsor 30 includes counter-rotating propellor shafts 34 and one or more propellors 36 coupled to the propellor shafts 34 such that rotation of the propellor shafts 34 causes rotation of the propellors 36, as is conventional.

Figure 3:
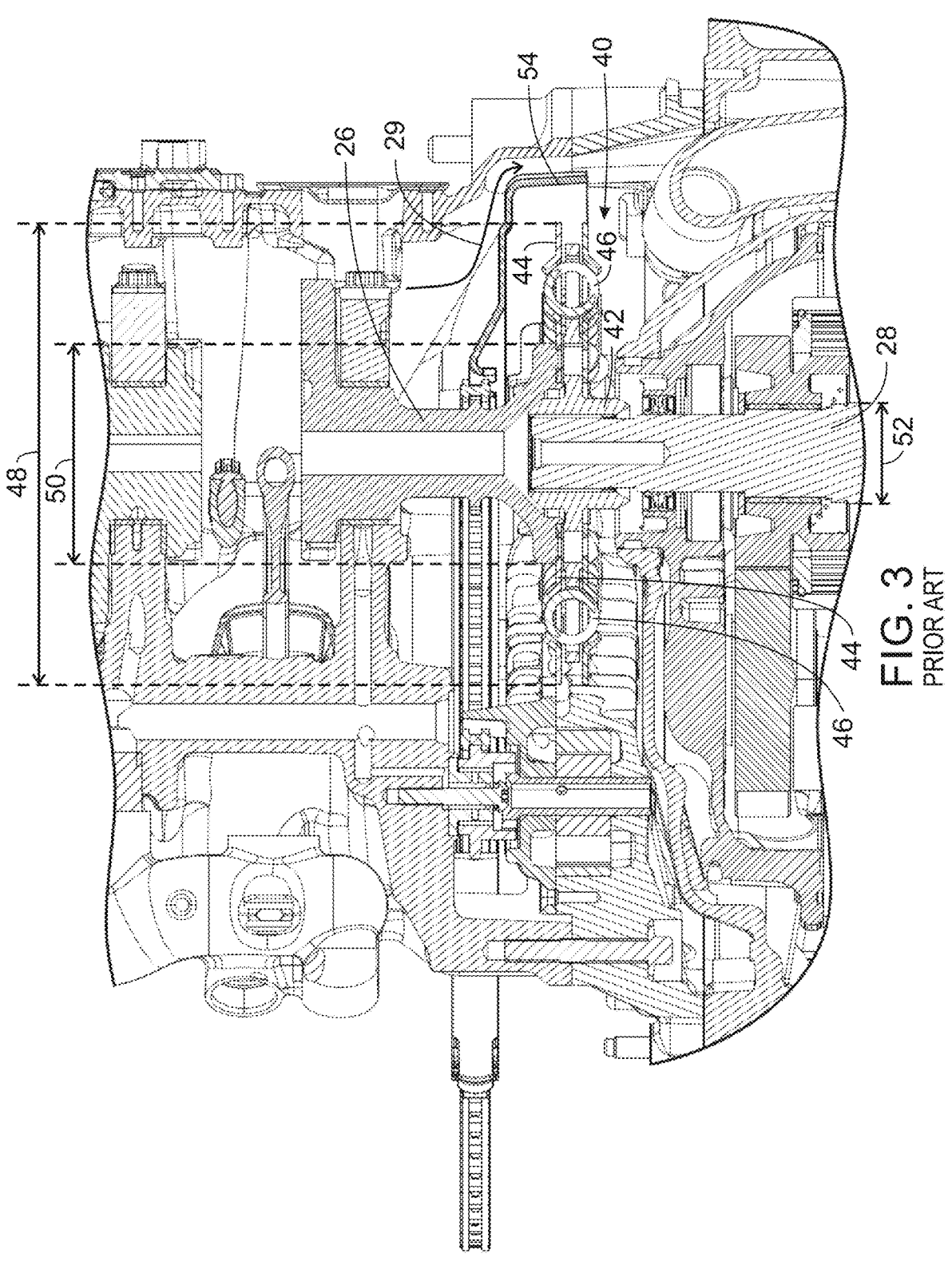
FIG. 3 is a cross-sectional view taken along the line 3-3 of FIG. 2 depicting a driveshaft and transmission coupling arrangement according to known methods.

Specifically referring to FIG. 3, the coupling of the crankshaft 26 and the transmission shaft 28 according to existing methods is depicted. Although this coupling is necessary to transmit torque from the crankshaft 26 to the transmission shaft 28, the coupling includes torsional vibration isolation features that ensure excitation modes of the cranktrain that are close to the inherent frequencies of the transmission are not transmitted to the transmission. This isolation prevents gear rattle, extends the lifespan of the components of the propulsion device, and provides a more comfortable ride in the marine vessel. FIG. 3 depicts the torsional vibration isolation that may be provided in the form of a plate-style spring coupler 40 between the crankshaft 26 and the transmission shaft 28. As shown, the plate-style spring coupler 40 includes an inner hub component 42 that is coupled to the transmission shaft 28, and an outer hub component 44 that is coupled to the crankshaft 26. The inner and outer hub components 42, 44 are coupled to each other using coil springs 46 that are oriented circumferentially and positioned at a certain radius from an axis of rotation of the crankshaft 26 and transmission shaft 28. The springs 46 are compressed as torque is transmitted and act to soften torsional impulses from the engine.

Notably, the maximum outer diameter 48 of the plate-style spring coupler 40 is shown to be larger than the maximum outer diameter 50 of the crankshaft 26 and the maximum outer diameter 52 of the transmission shaft 28. Due to this geometry, an umbrella component 54 may be positioned over the spring coupler 40 to prevent disruption in the flow of lubricating oil (see arrow 29 of FIG. 3) that drains from the engine block, bedplate, and main bearings back to the engine oil sump 25, and/or aeration of the lubricating oil due to contact between the oil and the moving components of the spring coupler 40. Aeration of oil is undesirable for several reasons. Aeration exposes oil to oxygen, which can lead to oxidative oil degradation. In addition, aerated oil is not a good thermal conductor, and aeration may restrict the normal flow of the oil, thus reducing the working oil level and impeding convective head transfer. For all of these reasons, contact between the coupler and the lubricating oil is to be avoided. Therefore, in some implementations, the plate-style spring coupler 40 may be encased within a sealed chamber in lieu of use of the umbrella component 54.

During research and experimentation in the field of outboard motors, the present inventors recognized that it is desirable to provide an alternative method of coupling a crankshaft and a transmission. Typical plate-style spring couplers, as depicted and described above with reference to FIG. 3, require multiple components that increase the cost, weight, and complexity of the propulsion device. In addition, the geometry of typical plate-style spring couplers can cause undesirable hindrance and/or aeration of lubricating oil that must be mitigated with additional components that likewise add to the cost, weight, and complexity of the propulsion device. The present disclosure arose based upon the inventors' recognition of the above challenges existing within the prior art.

Figure 4:
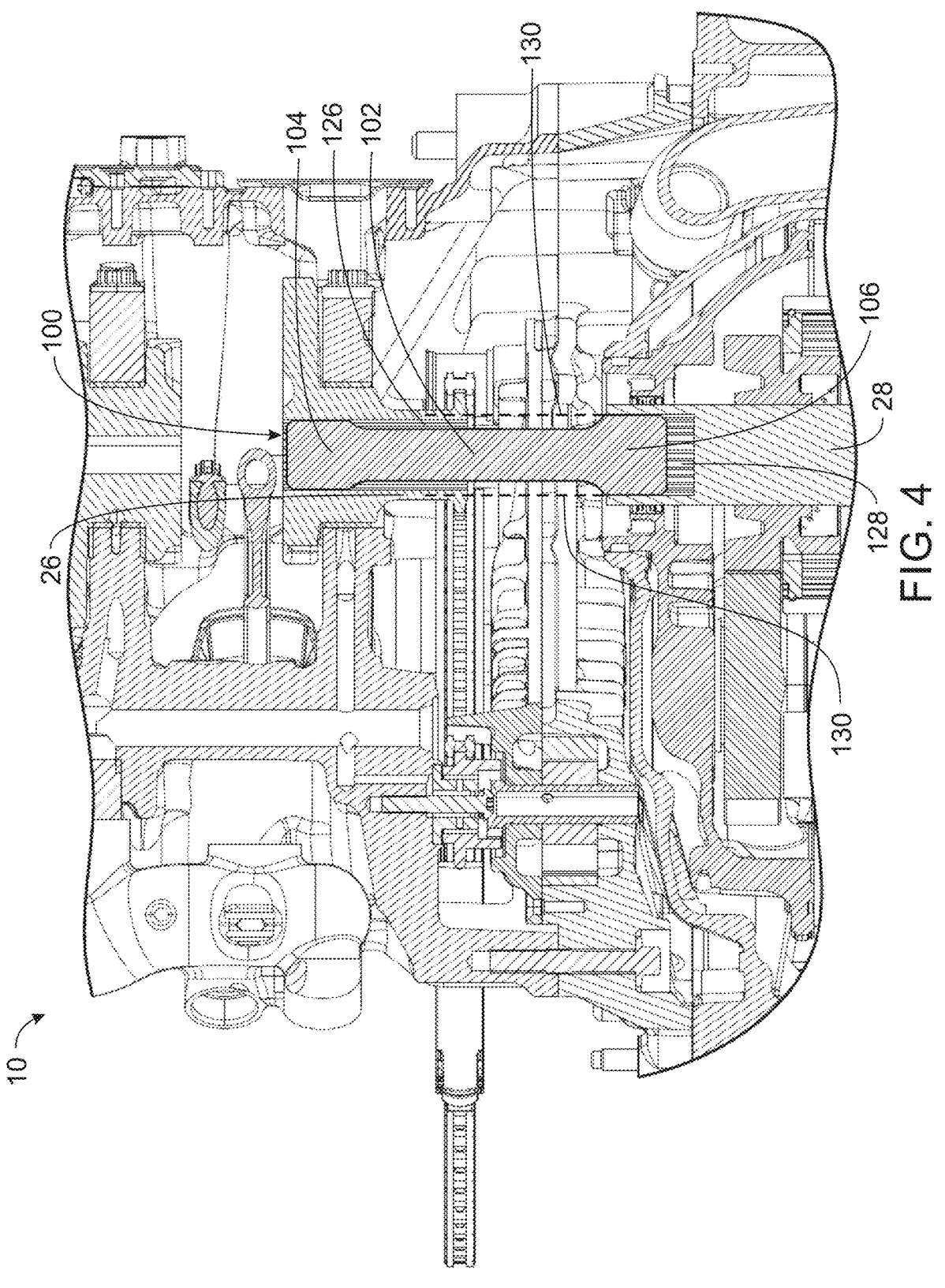
FIG. 4 is another cross-sectional view depicting a driveshaft and transmission coupling arrangement according to an exemplary implementation of the present disclosure.
Figures 5, 6:
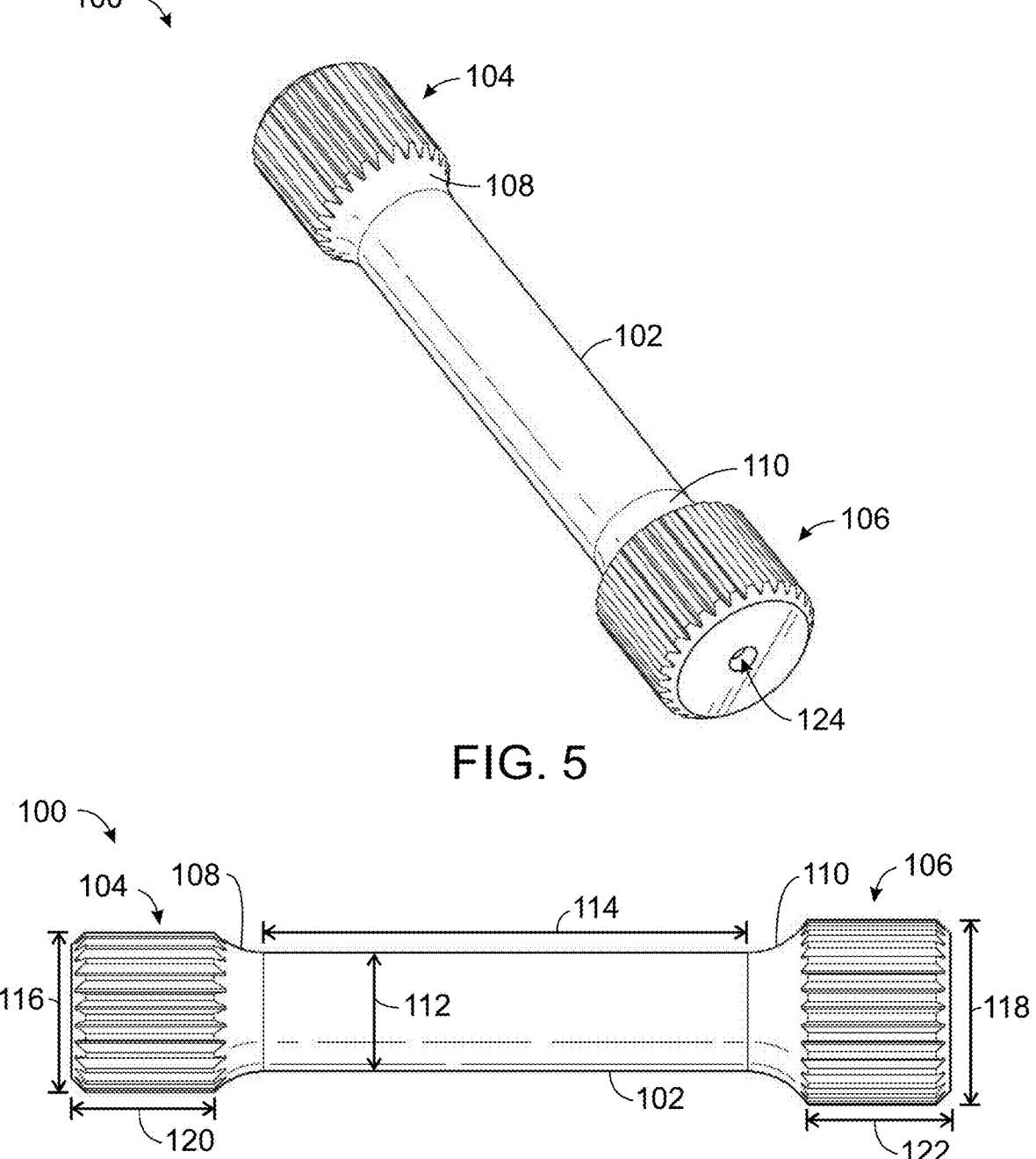
FIG. 5 is a perspective view of the spring coupler depicted in FIG. 4
FIG. 6 is a side view of the spring coupler depicted in FIG. 4.

Referring now to FIGS. 4-6, an improved coupler 100 according to an exemplary implementation of the present disclosure is depicted. Specifically, FIG. 4 depicts a side cross-sectional view of the coupler 100 installed in the outboard device 10, FIG. 5 depicts a perspective view of the coupler 100, and FIG. 6 depicts a side view of the coupler 100.

As best depicted in FIGS. 5 and 6, the coupler 100 is shown to include a cylindrical shaft 102 that extends between a first splined end 104 and a second splined end 106. Each of the splined ends 104, 106 is shown to include multiple external splines. Depending on the characteristics of the crankshaft 26 and the transmission shaft 28 to which the splined ends 104, 106 are coupled (see FIG. 4), the splined ends 104, 106 may include an equal number or a different number of external splines. For example, the coupler 100 depicted in the present disclosure includes 25 external splines on the first splined end 104, and 29 external splines on the second splined end 106. The design of the splines (i.e., the number, size, and shape of the splines) may depend on numerous factors including the required strength and manufacturability, and the location of the splines. For example, the greater the number of splines, the larger the pitch diameter and the more the load on the splined end is distributed, thereby reducing the average normal force on each tooth. Reducing the average normal force on each tooth reduces the frictional force that can act in the axial direction, thus permitting spline slip in the axial direction during thermal expansion and contraction. Permitting spline slip limits the loading that must be carried by the thrust bearing on the crankshaft, so the thrust bearing can be smaller. FIGS. 5 and 6 depict the splined ends 104, 106 as including flat root side fit splines, which advantageously have a self-centering tendency when torque is applied which aids in tooth load sharing. In addition, flat root side fit splines can be designed with some clearance for easier assembly. In other implementations, a different type of spline may be utilized.

A first filleted surface 108 is shown to be provided at the transitional region between the cylindrical shaft 102 and the first splined end 104, and a second filleted surface 110 is shown to be provided at the transitional region between the cylindrical shaft 102 and the second splined end 106. The filleted surfaces 108, 110 reduce stress concentrations in the transitional regions between the cylindrical shaft 102 and the splined ends 104, 106 when the coupler 100 is subjected to torsional loading. In an exemplary implementation, each of the filleted surfaces 108, 110 has a fillet radius of approximately (+10%) 0.5 inches.

In the implementation depicted in FIGS. 4-6, an outer diameter 112 of the cylindrical shaft 102 is approximately 0.8 inches, and a length 114 of the cylindrical shaft 102 between the first splined end 104 and the second splined end 106 (not inclusive of the filleted surfaces 108, 110) is approximately 5.0 inches. A method for optimizing the outer diameter 112 and the length 114 dimensions of the cylindrical shaft 102 is described in further detail below with reference to FIG. 7. An outer diameter 116 of the first splined end 104 is approximately 1.1 inches, and an outer diameter 118 of the second splined end 106 is approximately 1.3 inches. In the implementation depicted in FIGS. 4-6, each of the respective lengths 120 and 122 of the first splined end 104 and the second splined end 106 is approximately 1.0 inches. The lengths 120 and 122 are intended to be the shortest length possible to withstand the contact stress and bending imposed on the coupler 100 for the given diameters 116, 118 and pitches of the splines. In some implementations, as specifically depicted in FIG. 5, the coupler 100 further includes a through hole 124 with countersunk ends. The presence of the through hole 124 may aid the fabrication process and reduce the weight of the coupler 100, although the present inventors have recognized that a through hole 124 that is too large in diameter will reduce the torsional stiffness and load carrying capacity of the coupler 100.

Turning specifically to FIG. 4, the first splined end 104 is shown to be interdigitated or mated with an internal splined surface 126 formed in the crankshaft 26, and the second splined end 106 is shown to be interdigitated or mated with an internal splined surface 128 formed in the transmission shaft 28. Advantageously, both splined ends 104 and 106 are blind mated with the splined surfaces 126 and 128. As compared with other coupling methods, blind mate coupling results in reduced production, installation, and maintenance costs, as well as shorter assembly times, fewer errors during assembly, and greater serviceability.

In addition, in contrast to the plate-style spring coupler 40 depicted in FIG. 3, the entirety of the coupler 100 resides within an envelope 130 having a diameter equal to the maximum diameter of the internal splined surface 128 of the transmission shaft 28. In other words, no portion of the coupler 100 protrudes in a radial direction beyond the extents of either the crankshaft 26 or the transmission shaft 28 such that the coupler 100 impedes the flow of lubricating oil, or otherwise contacts the oil leading to aeration. Accordingly, utilization of the coupler 100 does not require an umbrella (see umbrella component 54, depicted in FIG. 3) or a sealing housing to protect the lubricating oil.

In an exemplary implementation, the coupler 100 is fabricated from titanium or a titanium alloy. Titanium and titanium alloys exhibit several favorable characteristics for the present application, including high tensile strength, low weight, and high corrosion resistance. In an exemplary implementation, the coupler 100 is fabricated from TIME-TAL® Ti-18 alloy. As compared with steel, titanium has a lower modulus of rigidity and a higher fatigue strength, thereby permitting a reduction in the length 114 of the coupler 100. In some implementations, the titanium may be hardened via a heat treatment process (e.g., nitriding, carburizing). In still further implementations, the coupler 100 may be fabricated from steel, for example, if a stiffer coupler is required. Regardless of the material ultimately utilized to fabricate the coupler 100, the simple design of the coupler 100 results in lower manufacturing and material costs than alternative coupler designs (e.g., the plate-style spring coupler 40, depicted in FIG. 3).

Referring now to FIG. 7, a flow chart depicting a process 700 for optimizing the outer diameter 112 and the length 114 of the cylindrical shaft 102 of the coupler 100 is depicted. Process 700 commences with step 702, in which the torsional spring rate for the coupler 100 is determined based on the specific characteristics of the marine propulsion device 10. The torsional spring rate is an amount of force to achieve 1 degree of rotational deflection. Since the torsional spring rate can vary based on the characteristics of the marine propulsion device 10, determination of the torsional spring rate for a particular coupling 100 may be accomplished via a torsional vibration analysis or by instrumentation and practical testing of the marine propulsion device 10. For example, the practical testing may involve utilizing a toothed steel target wheel with inductive pickup or Hall effect sensors positioned at the input and the output of the shaft as well as at important locations within the transmission. This sensor arrangement permits relative velocity and relative rotational angles to be compared at each of the sensor locations such that the data captured by the sensors can be used to tune the torsional vibration analysis model. The number of teeth on the target wheel is important for setting the resolution of the measurement as well as ensuring the frequency of tooth pass is within the capability of the sensors. To collect data, speed sweeps under load may be performed and data from each of the sensors may be recorded simultaneously using a data acquisition system.

At step 704, the outer diameter 112 for the cylindrical shaft 102 of the coupler 100 is calculated based on the characteristics of the marine propulsion device 10 and the material properties of the coupler 100. The necessary load capacity of the coupler 100 to carry both the peak torque and alternating torque (i.e., fatigue loading) is critical and creates a constraint on the minimum allowable outer diameter 112. When a shaft is subjected to a torque, a shear stress is induced in the shaft that varies from zero at the center of the shaft to a maximum value at the outer surface of the shaft. The shear stress in a solid circular shaft (i.e., the cylindrical shaft 102) for a given position is expressed as:

$$t = \frac{Tr}{J} \qquad \text{(Equation 1)}$$

where t is the shear stress, T is the torque applied to the shaft, r is the distance from the center of the shaft to the stressed surface in the given position, and J is the polar moment of inertia, which is a measure of a beam's ability to resist torsion. For a circular solid shaft (i.e., assuming that the coupler 100 does not include through hole 124, depicted in FIG. 5), the equation for the polar moment of inertia J is as follows:

$$J = \frac{\pi D^4}{32} \qquad \text{(Equation 2)}$$

where D is the outer diameter 112 of the cylindrical shaft 102. Thus, Equation 2 may be substituted into Equation 1, with r=D/2 such that the Equation 1 is representative of shear stress at the outer diameter of the cylindrical shaft 102 (i.e., the location of the cylindrical shaft 102 that experiences the maximum shear stress).

The fatigue limit of a material is defined as the highest stress that a material can withstand for an infinite number of cycles without fatigue failure. Accordingly, by substituting the fatigue limit in Equation 1 for the shear stress t, and assuming a known torque T exerted by the marine propulsion device 10 on the coupler 100, it is possible to solve Equation 1 for D and determine a minimum outer diameter 112 for the cylindrical shaft 102. For example, according to an exemplary implementation of the present disclosure, if the coupler 100 is fabricated from titanium having a fatigue limit=t=600 MPa, and the torque exerted on the coupler 100=T=900 Nm, the outer diameter 112 for the cylindrical shaft 102 is 20 mm or 0.8 inches. In some implementations, the value used for the torque exerted on the coupler will include a safety factor multiplier that is utilized to ensure that the coupler 100 can withstand unknown and/or extraordinary conditions without failure. Such unknown or extraordinary conditions that may apply a large torque impulse to the coupler 100 include, for example, the propellors 36 striking a submerged object or re-entering the water after wave jumping.

At step 706, the length 114 for the cylindrical shaft 102 of the coupler 100 is calculated based on the target spring rate determined in step 702, the outer diameter 112 of the cylindrical shaft 102 determined in step 704, and the material properties of the coupler 100. The angular deflection of a solid shaft with torsion loading applied is as follows:

$$\Theta = \frac{LT}{GJ} \qquad \text{(Equation 3)}$$

where Θ is the angular shaft deflection, T is again the torque applied to the shaft, G is the shear modulus of rigidity of the coupler material, J is again the polar moment of inertia, and L is the length of the shaft. Since D, the outer diameter 112 of the cylindrical shaft 102, was determined in step 704, it is possible to solve for L, the length 114 of the cylindrical shaft 102, for a given angular deflection and torque.

Process 700 concludes with step 708, in which a coupler 100 is provided having the outer diameter 112 and the length 114 of the cylindrical shaft 102 determined in steps 704 and 706. As depicted in FIG. 4, once the coupler 100 has been fabricated with the optimized outer diameter 112 and length 114, it may be blind mated with both the crankshaft 26 and the transmission shaft 28 to transfer torque from the crankshaft 26 to the transmission shaft 28.

In the present disclosure, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and devices. Various equivalents, alternatives and modifications are possible within the scope of the appended claims.

What is claimed is:

1. An outboard marine propulsion device for a marine vessel, comprising:
    a cowling structure;
    a crankshaft operably coupled to an engine and having a first plurality of internal splines;
    a transmission shaft operably coupled to one or more propellers and having a second plurality of internal splines, wherein the transmission shaft is generally parallel to the crankshaft;
    a torsional spring coupler having a cylindrical shaft that extends from a first end having a first plurality of external splines that is directly coupled to the first plurality of internal splines to a second end having a
second plurality of external splines that is directly
coupled to the second plurality of internal splines such
that torque is transmitted from the engine to the one or
more propellers and wherein the torsional spring cou-
pler is configured to isolate the transmission shaft from
torsional vibrations of the crankshaft,
wherein the crankshaft, engine, transmission shaft, and
coupler are disposed within the cowling structure;
wherein the torsional spring coupler is fabricated from at
least one of titanium and a titanium alloy; and
wherein no portion of the torsional spring coupler extends
radially outward of the crankshaft or the transmission
shaft such that a flow of oil from the engine past the
crankshaft and the transmission shaft is not impeded by
the torsional spring coupler.
2. The outboard marine propulsion device of claim 1,
wherein the torsional spring coupler further comprises a first
filleted surface located between the cylindrical shaft and the
first end and a second filleted surface located between the
cylindrical shaft and the second end.
3. The outboard marine propulsion device of claim 1,
wherein the second plurality of external splines is greater
than the first plurality of external splines.
4. The outboard marine propulsion device of claim 1,
wherein an outer diameter of the cylindrical shaft is less than
a maximum diameter of the first end and a maximum
diameter of the second end.
5. The outboard marine propulsion device of claim 1,
wherein the titanium alloy is TIMETAL® Ti-18 alloy.
6. An outboard marine propulsion device for a marine
vessel, comprising:
a cowling structure;
a first shaft operably coupled to an engine and having a
first plurality of internal splines;
a second shaft having a second plurality of internal
splines, wherein the first shaft is generally parallel to
the second shaft; and a coupler having a cylindrical shaft that extends from a
first end coupled to the first shaft via a first plurality of
external splines interdigitated with the first plurality of
internal splines to a second end coupled to the second
shaft via a second plurality of external splines inter-
digitated with the second plurality of internal splines
such that torque generated by the first shaft is trans-
mitted from the first shaft to the second shaft to propel
the marine vessel and wherein the coupler is configured
to isolate the second shaft from torsional vibrations of
the first shaft;
wherein the first shaft, the second shaft, and the coupler
are disposed within the cowling structure;
wherein the coupler is fabricated from at least one of
titanium and a titanium alloy;
wherein an outer diameter of the cylindrical shaft is less
than a maximum diameter of the first plurality of
internal splines and a maximum diameter of the second
plurality of internal splines; and
wherein no portion of the coupler extends radially out-
ward of the first shaft or the second shaft such that a
flow of oil from the engine past the first shaft and the
second shaft is not impeded by the coupler.
7. The outboard marine propulsion device of claim 6,
wherein the first shaft comprises a crankshaft that is oper-
ably coupled to the engine.
8. The outboard marine propulsion device of claim 7,
wherein the second shaft comprises a transmission that is
operably coupled to one or more propellers.
9. The outboard marine propulsion device of claim 6,
wherein the first plurality of external splines is not equal to
the second plurality of external splines.
10. The outboard marine propulsion device of claim 9,
wherein the second plurality of external splines is greater
than the first plurality of external splines.

* * * * *